Sept. 13, 1966  E. A. PRIJATEL  3,272,518
PUMP SHAFT SEAL
Filed March 25, 1963
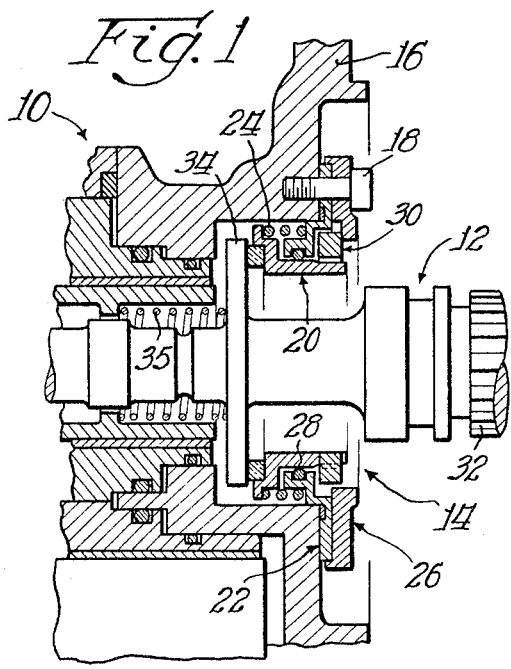
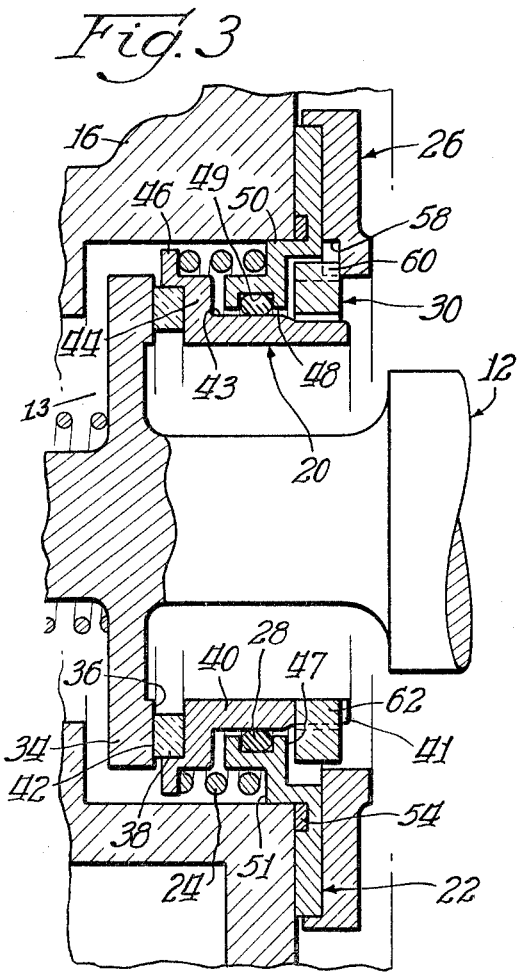
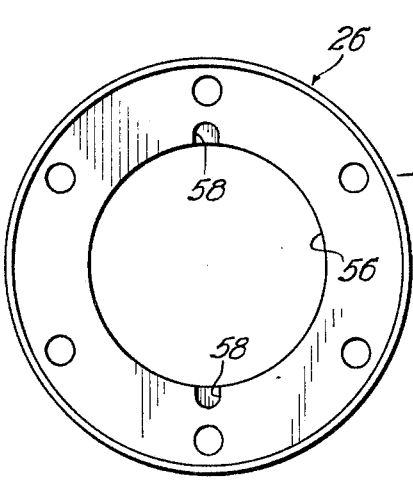
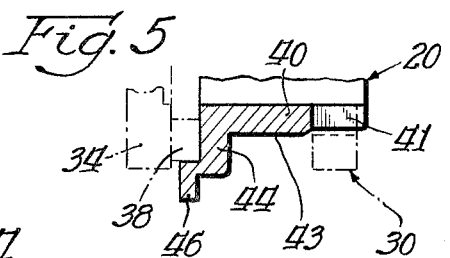
Inventor:
Edward A. Prijatel
By: Frank R. Thienpont  Atty.

3,272,518
PUMP SHAFT SEAL

Edward A. Prijatel, Lyndhurst, Ohio, assignor to Borg-Warner Corporation, Chicago, Ill., a corporation of Illinois
Filed Mar. 25, 1963, Ser. No. 267,730
2 Claims. (Cl. 277—30)

This invention relates to rotary shaft seals and particularly to a seal arrangement which is adapted for a fluid pump drive shaft coupling wherein provision must be made for a limited variation in the position of the axis of rotation of the drive shaft as well as a limited amount of axial movement of the shaft.

In the prior art as disclosed, for example, in the U.S. Patents to Roth 2,434,589 and to Campbell 2,867,456 a diaphragm seal is used to prevent fluid from leaking out of a pump around a drive shaft which is used to drive the pumping elements. While the diaphragm type seal was a favorable factor in helping to provide for possible axial misalignment in certain applications as described, for example, in the above two cited patents, other problems are associated with its use. For example, one of the problems encountered with the diaphragm type seal is that it has a tendency to rupture under certain conditions such as during initial assembly or during overhaul operations.

My invention is designed to eliminate the problems encountered with the use of a relatively fragile diaphragm seal by using an O-ring seal. My particular arrangement is effective to provide an adequate seal while at the same time providing for a limited amount of axial misalignment of the drive shaft. This is accomplished through the proper arrangement of the O-ring seal and a wobble washer in a fluid seal assembly to give the proper universal joint type action.

It is an object of this invention to provide a rotary shaft seal which is less susceptible to damage than a rubber diaphragm type seal.

It is a further object to provide a sealing arrangement incorporating an O-ring static seal which will at the same time permit a limited variation in the position of the drive shaft axis.

It is a further object to provide a shaft seal arrangement which incorporates the combination of an O-ring seal and a wobble washer type universal joint arrangement to facilitate limited misalignment of the drive shaft axis.

Other and more particular objects, advantages, and uses of my invention will become apparent from the reading of the following specification taken in connection with the accompanying drawings which form a part thereof:

FIGURE 1 is a broken-away axial section of my rotary shaft seal arrangement illustrated in connection with a fluid pump;

FIGURE 2 is an illustration of the wobble washer;

FIGURE 3 is an enlarged view of a portion of the fluid seal assembly;

FIGURE 4 is a front view of the retainer ring showing the slots for receiving the tangs of the wobble washer;

FIGURE 5 is an enlarged view of a portion of the seal ring assembly illustrating the grooved portions for receiving the tangs of the wobble washer.

Referring now in greater detail to the figures of the drawings, my invention is shown for illustrative purposes in connection with a portion of a rotary fluid pump which is indicated generally at 10 and is adapted to receive a drive shaft coupling 12 through the cavity 13 for driving fluid pumping elements (not shown). A cover member 16 is used to secure the fluid seal arrangement in place by any applicable means such, for example, as bolts 18.

The fluid seal arrangement 14 comprises a seal ring assembly 20, a support means 22 for the seal ring assembly, a spring means 24, a retainer means 26 an O-ring seal 28 and a wobble washer 30. The drive shaft coupling 12 may be driven through an external source of power through the spline connection 32. At its opposite end (not shown) the drive shaft is adapted to be connected by either an internal or external spline to a gear pumping element. The drive shaft 12 has formed thereon intermediate the ends thereof a radially extending flange 34. A compression spring 35 acts against the flange 34 to urge the shaft 12 to the right as viewed in FIGURE 1. Flange 34 has formed thereon a radially extending sealing surface 36.

The seal ring assembly 20 comprises a seal ring 38 and a longitudinally extending seal ring holder 40. The seal ring 38 has formed thereon a radially extending surface 42 which is adapted to engage the sealing surface 36 of the flange 34 of the drive shaft 12. The seal ring 38 preferably is a carbon type seal ring. It may also be a metallic type seal ring.

The seal ring holder 40 is of a generally cylindrical shape and extends longitudinally. The static O-ring seal 28 is adapted to be received by the outer periphery 43 of the longitudinally extending section. The holder 40 has formed thereon a stepped radially outwardly extending flange portion which comprises a radially extending flange 44 and an offset radially extending shoulder 46. At the end of the seal ring holder 40 opposite the seal ring 38 there are formed a pair of slots 41 spaced approximately 180° apart and adapted to receive protuberances or tangs formed on the inner periphery of the wobble washer 30. The purpose of this will be explained more fully.

The support means 22 is generally of a circular disc type construction. It has formed on the inner periphery thereof a stepped portion 47 and on the radially innermost surface 48 thereof there is formed a groove 49 which is adapted to receive the O-ring seal 28. The inner periphery 48 of the portion 47 is spaced a substantial distance from the outer periphery 43 of the seal ring holder in order to permit the seal ring holder 40 room for pivoting movement around the O-ring seal 28 as well as axial movement relative to the support means 22. The support means 22 also comprises a radially extending portion 50 which is adapted to be secured against the pump housing in conjunction with the retainer means 26 by means of the bolts 18. A sealing ring 54 may be used to assist in effecting a tighter peripheral seal between the support means 22 and the pump housing 12.

Between the portions 47 and 50 is a shoulder portion 51 which serves as a seat for one end of the compression spring means 24. The other end of the spring means 24 is seated against the shoulder 46 of the seal ring holder 40.

The retainer means 26 is also a generally circular disc ring formed with a central aperture 56 to surround the shaft 12. The inner periphery of the retainer 26 has formed thereon a pair of slots or notches 58 substantially 180° apart adapted to receive protuberances or tangs formed on the outer periphery of the wobble washer 30. In the assembly it will be noted that the pair of notches 58 are displaced substantially 90° from the pair of notches 41 in the seal ring holder 40.

The wobble washer is a circular ring having formed on the outer periphery thereof a pair of protuberances or tangs 60 approximately 180° apart adapted to fit into the mating pair of notches 58 formed on the inner periphery of the retainer means 26. The wobble washer also comprises a second pair of protuberances or tangs 62 formed on the inner periphery thereof and adapted to fit into the slots 41 in the seal ring holder 40. It will be noted that the pair of tangs 62 on the inner periphery are spaced substantially 90° from the pair of tangs 60 on the outer periphery. The wobble washer in its construction with the retainer ring means also operates to absorb axial thrust of the shaft 12.

It is readily apparent from the above description of the association of the various parts that when the drive shaft 12 is subjected to a slight axial misalignment, that is, displacement from its normal axis of rotation, without a compensating means to take up this misalignment the sealing surface 36 on the flange 34 and the sealing surface 42 on the seal ring 38 may tend to become separated to some slight extent. However, with the flexible sealing arrangement provided by this invention slight drive shaft misalignment may be absorbed due to the coaction of the O-ring seal 28 and wobble washer 30, which together, are effective to provide a universal joint action. At the same time the flexible spring means 24 constantly urges the seal ring 38 into engagement with the flange 34.

Thus this invention provides several advantages over the prior art. The use of the O-ring seal as the static seal means is less expensive. Also the O-ring seal is less susceptible to damage than the diaphragm seal illustrated in the referred to patents. In addition, the O-ring seal advantageously provides only one leakage path, as distinguished from the diaphragm seal, which actually provides two leakage paths, that is, one between the seal disc and the confining ring and another at the connection between the pump housing and the cover which is used to secure the diaphragm seal in place.

While a certain preferred embodiment of the invention has been specifically disclosed, it is understood that the invention is not limited thereto, as a number of variations will be readily apparent to those skilled in the art and the invention is to be given its broadest possible interpretation within the terms of the following claims.

I claim:
1. A fluid seal assembly for a rotary shaft having a radially extending flange thereon comprising: a seal ring assembly encircling the shaft, said seal ring assembly comprising a seal ring and a longitudinally extending seal ring holder; support means encircling the shaft and telescopically supporting said seal ring assembly; spring means positioned between said seal ring assembly and said support means to urge said seal ring assembly into engagement with the radially extending flange on the shaft; retainer ring means for retaining said support means; and axial misalignment compensating means comprising a wobble washer radially positioned between said retaining ring and seal ring assembly and O-ring seal means encircling said longitudinally extending portion of said seal ring assembly and positioned between said longitudinally extending portion and said support means to provide a seal therebetween on said wobble washer for cooperatively associating said wobble washer with said retainer ring means and said seal ring assembly, said means comprising a first pair of tangs on the outer periphery of said washer spaced substantially 180 degrees apart for association with said retainer ring means and a second pair of tangs on the inner periphery of said washer spaced approximately 90 degrees from said first pair of tangs for association with said seal ring assembly.

2. A fluid seal assembly for a rotary shaft having a radially extending flange thereon comprising: a seal ring assembly encircling the shaft, said seal ring assembly comprising a seal ring, support means encircling the shaft and telescopically supporting said seal ring assembly; spring means to urge said seal ring assembly into engagement with the radially extending flange on the shaft; retainer ring means for retaining said support means; and axial misalignment compensating means comprising a wobble washer positioned between said retainer ring and said seal ring assembly, and O-ring seal means encircling said longitudinally extending portion of said seal ring assembly and positioned between said longitudinally extending portion and said support means to provide a seal therebetween and means on said wobble washer for cooperatively associating said wobble washer with said retainer ring means and said seal ring assembly, said means comprising a first pair of radially outwardly extending tangs substantially 180 degrees apart for association with said retainer ring means and a second pair of radially inwardly extending tangs spaced substantially 90 degrees from said first pair of tangs for association with the retainer ring means of said seal ring assembly.

References Cited by the Examiner
UNITED STATES PATENTS

| | | | |
|---|---|---|---|
| 2,434,589 | 1/1948 | Roth | 277—8 |
| 3,081,097 | 3/1963 | Dison et al. | 277—74 X |
| 3,109,659 | 11/1963 | Gits et al. | 277—38 |

SAMUEL ROTHBERG, *Primary Examiner.*